US006590566B2

(12) United States Patent
Abe

(10) Patent No.: US 6,590,566 B2
(45) Date of Patent: Jul. 8, 2003

(54) INPUT AND OUTPUT KEYBOARD

(75) Inventor: Toshiyasu Abe, 4815 Somerset Dr. SE., Bellevue, WA (US) 98006-3432

(73) Assignee: Toshiyasu Abe, Bellevue, WA (US)

( * ) Notice: Subject to any disclaimer, the term of this patent is extended or adjusted under 35 U.S.C. 154(b) by 7 days.

(21) Appl. No.: 09/808,289

(22) Filed: Mar. 13, 2001

(65) Prior Publication Data

US 2002/0130845 A1 Sep. 19, 2002

(51) Int. Cl.[7] ................................. G09G 5/00
(52) U.S. Cl. ....................... 345/168; 345/169
(58) Field of Search .................. 345/160, 168, 345/169; 341/22, 21, 27; 379/396; 708/168; 434/112–117; 400/109–111, 483

(56) References Cited

U.S. PATENT DOCUMENTS

| 4,680,577 A | * | 7/1987 | Straayer et al. ............. 345/160 |
| 5,521,596 A | * | 5/1996 | Selker et al. ................. 341/22 |
| 5,774,540 A | * | 6/1998 | Davidson et al. ........... 379/396 |
| 5,841,855 A | * | 11/1998 | Davidson et al. ........... 379/396 |
| 6,015,224 A | * | 1/2000 | Greenstein ................... 708/168 |

* cited by examiner

Primary Examiner—Steven Saras
Assistant Examiner—Uchendu O. Anyaso
(74) Attorney, Agent, or Firm—Black Lowe & Graham PLLC

(57) ABSTRACT

A user interface device for allowing people with and without impairments to easily send and receive alphanumeric messages. The device includes a plurality of geometrically-shaped keys slidably retained within a housing, each key being associated with a plurality of characters or symbols. The device also includes a key driver system that includes a processing component configured to generate key motion signals according to output information, and key motion drivers configured to drive one or more of the keys based on the generated key motion signals. The key motion drivers include a lateral motion component configured to move the one or more keys in a directional plane approximately parallel to a surface of the keys, and key identifier components configured to move a corresponding one or more keys of the plurality of keys in a directional plane approximately perpendicular to the surface of the keys.

19 Claims, 6 Drawing Sheets

INPUT AND OUTPUT KEYBOARD

FIELD OF THE INVENTION

This invention relates to keyboards with dual purpose; input and output.

BACKGROUND OF THE INVENTION

Previously, communications devices used by those with speech and/or hearing handicaps included teletype, and telegraphic devices. Teletype devices are standard equipment connected to a telephone system by means of a modem. Teletypes are large, heavy, and expensive. They can be used to communicate only with another compatible teletype. Furthermore, teletype systems cannot communicate with any telephone or with a visually impaired person.

Telegraphic devices utilize either a sound-activated switch or a frequency detector connected to a light or vibrator, which is activated in response to a signal that may be conveyed over a standard telephone circuit. This allows a message to be transmitted in a code such as Morse Code. Telegraphic devices are limited to use with similar devices and further require the memorization of Morse Code or other complicated codes. They are also subject to interference by noise, are slow, and are difficult to use, requiring a degree of manual dexterity.

Therefore, there exists a need to provide a user friendly input/output system for allowing visually impaired and those who wish to communicate in noise sensitive environments to allow people with and without impairments to easily send and receive messages over various communication devices (cell phones, personal data assistants, or other communication devices).

SUMMARY OF THE INVENTION

A user interface device for allowing people with and without impairments to easily send and receive alphanumeric messages is provided. The device includes a plurality of geometrically-shaped keys sidably retained within a housing, each key being associated with a plurality of characters or symbols. The device also includes a key driver system that includes a processing component configured to generate key motion signals according to output information, and key motion drivers configured to drive one or more of the keys based on the generated key motion signals. The key motion drivers include a lateral motion component configured to move the one or more keys in a directional plane approximately parallel to a surface of the keys, and key identifier components configured to move a corresponding one or more keys of the plurality of keys in a directional plane approximately perpendicular to the surface of the keys.

In accordance with other aspects of the invention, the lateral motion component includes a plurality of electromagnets.

In accordance with still further aspects of the invention, the key identifier component includes a plurality of solenoids, wherein each of the solenoids is assigned to a separate key.

In accordance with yet other aspects of the invention, each key is hexagon-shaped.

In accordance with still another aspect of the invention, the lateral motion component drives the plurality of keys in directions that correspond to each edge of the keys.

In accordance with further aspects of the invention, each character and symbol associated with a key is further associated with a lateral motion direction and the output information is a text message. The processing component is further configured to parse the text message into base components, base components correspond to one of the characters or symbols associated with the keys, and to generate a pair of key motion signals for each base component. The generated pair of key motion signals includes a lateral signal for directing the lateral motion component and a key signal for directing one of the key identifier components.

In accordance with still further aspects of the invention, one or more base components correspond to one or more words that are associated with a lateral motion direction and a key.

As will be readily appreciated from the foregoing summary, the invention provides a new device for allowing users with visual or hearing impairments to communicate with unimpaired or impaired users without the need for a special communication device.

BRIEF DESCRIPTION OF THE DRAWINGS

The preferred embodiment of the present invention is described in detail below with reference to the following drawings.

DETAILED DESCRIPTION OF THE PREFERRED EMBODIMENT

Figure 1:
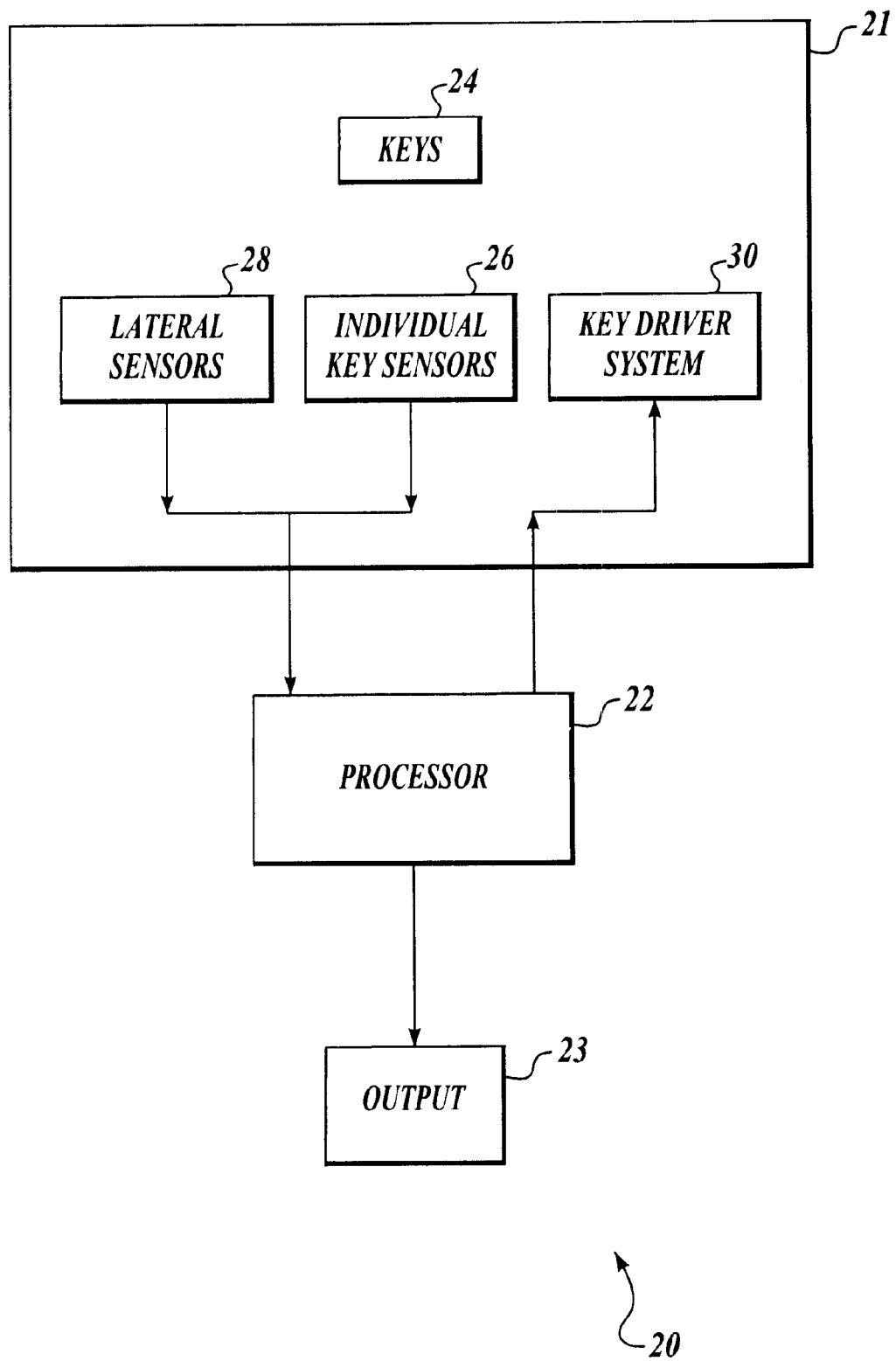
FIG. 1 is a block diagram of the components of the present invention.

FIG. 1 illustrates components of an input/output keyboard system 20 formed in accordance with the present invention. The input/output keyboard system 20 includes a dual-purpose keyboard 21 connected to a processor 22. The processor 22 is connected to an output device 23. The output device 23 is preferably a display device. The dual-purpose keyboard 21 includes a plurality of keys 24, individual key sensors 26, a set of lateral sensors 28 and a key driver system 30. When a user depresses a key, one of the individual key sensors 26 generates a key select signal that indicates which key has been selected. When the keys 24 are moved laterally, the lateral sensors 28 generate a lateral signal that indicates the direction of motion. The generated signals are sent to the processor 22 for analysis. The processor 22 generates an output signal for directing operation of the output device 23 based upon the analysis. The input functionality is hereby incorporated by reference to copending U.S. patent application Ser. No. 09/785,813, filed Feb. 16, 2001, titled "IMPROVED KEYBOARD"—attorney docket no. OPAS-1-1001.

The key driver system 30 drives movement of the keys 24 for conveying messages to a user based on key driving signals received from the processor 22. The driven movements include a pair of key movements. Each pair of key movements is associated with a character, word or function in a keyboard system designed for a character based language such as French or English. When a user's fingers are in contact with the keys 24, the user interprets each pair of key movements with the associated character, symbol, word or function. Examples of characters are letters, phonetic characters, and numbers. With the present invention, text messages are deliverable to users that choose not to or cannot view the sent message if it was to be displayed or to hear a voice message. An example of this key driving process and example system components for executing this process are described in more detail below.

Figure 2:
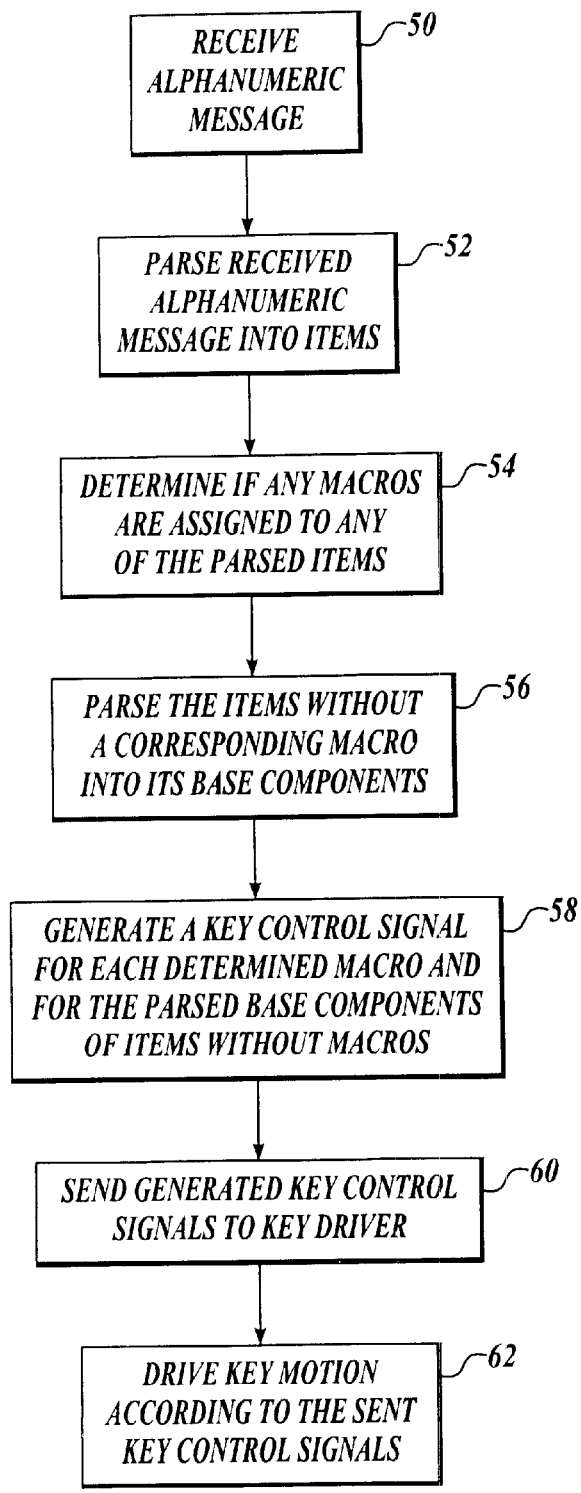
FIG. 2 is a flow diagram illustrating the process performed by the components of FIG. 1.
Figure 7A:
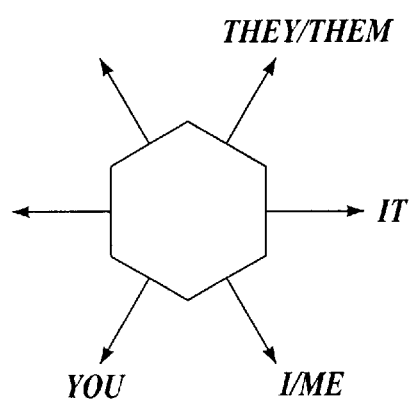
FIGS. 7A–C are diagrams illustrating word and key direction associations.
Figure 7B:
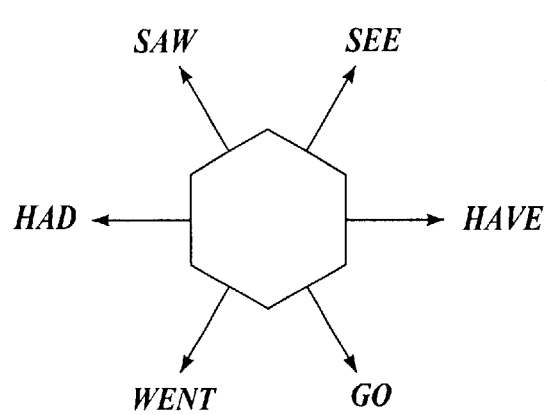
Figure 7C:
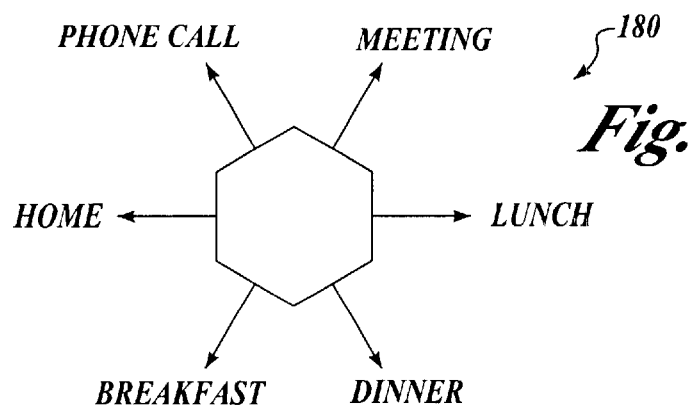

FIG. 2 illustrates an example process performed by the input/output keyboard system 20 shown in FIG. 1 for making the keyboard function as an output device. First, at block 50, the processor 22 receives or generates an alphanumeric message. Electronic mail messages are examples of received alphanumeric messages. Examples of messages generated by the processor 22 are an alert message stored in memory associated with the processor 22 or a message generated by the processor 22 according to user input. Next, at block 52, the processor 22 parses the received alphanumeric message into items. Items are words, numbers, symbols or functions. Then, at block 54, the processor 22 determines whether any macros are assigned to any of the parsed items. A macro is a single computer instruction that stands for a sequence of operations. In one embodiment, macros link a pair of output key motions to a word or symbol. Preferably the linked word or symbol are from a group of words or symbols commonly used in messages. FIGS. 7A–C illustrate examples of some linked words. At block 56, the processor 22 parses items that do not correspond to a macro into their base components. The base components are the letters of a parsed word. Then, at block 58, the processor 22 generates a key control signal for each determined macro and for the parsed base components of items without macros. Each key control signal includes a pair of key motion instructions; vertical key motion instruction and horizontal key motion instruction. A vertical key motion instruction identifies the key associated with the macro or base component. A horizontal key motion instruction identifies a direction of motion associated with the macro or base component. At block 60, the processor 22 sends the generated key control signals to the key driver system 30. The output occurs, at block 62, when the user's fingers or hand is in sufficient contact with the keys so as to detect lateral and vertical key motions and when the key driver system 30 drives key motion according to the sent key control signals. The key driver system 30 moves the keys laterally (i.e., approximately parallel to the plane of the keys) according to the horizontal key motion instruction and moves a key vertically (i.e., approximately perpendicular to the plane of the keys) according to the vertical key motion instruction.

Figure 3:
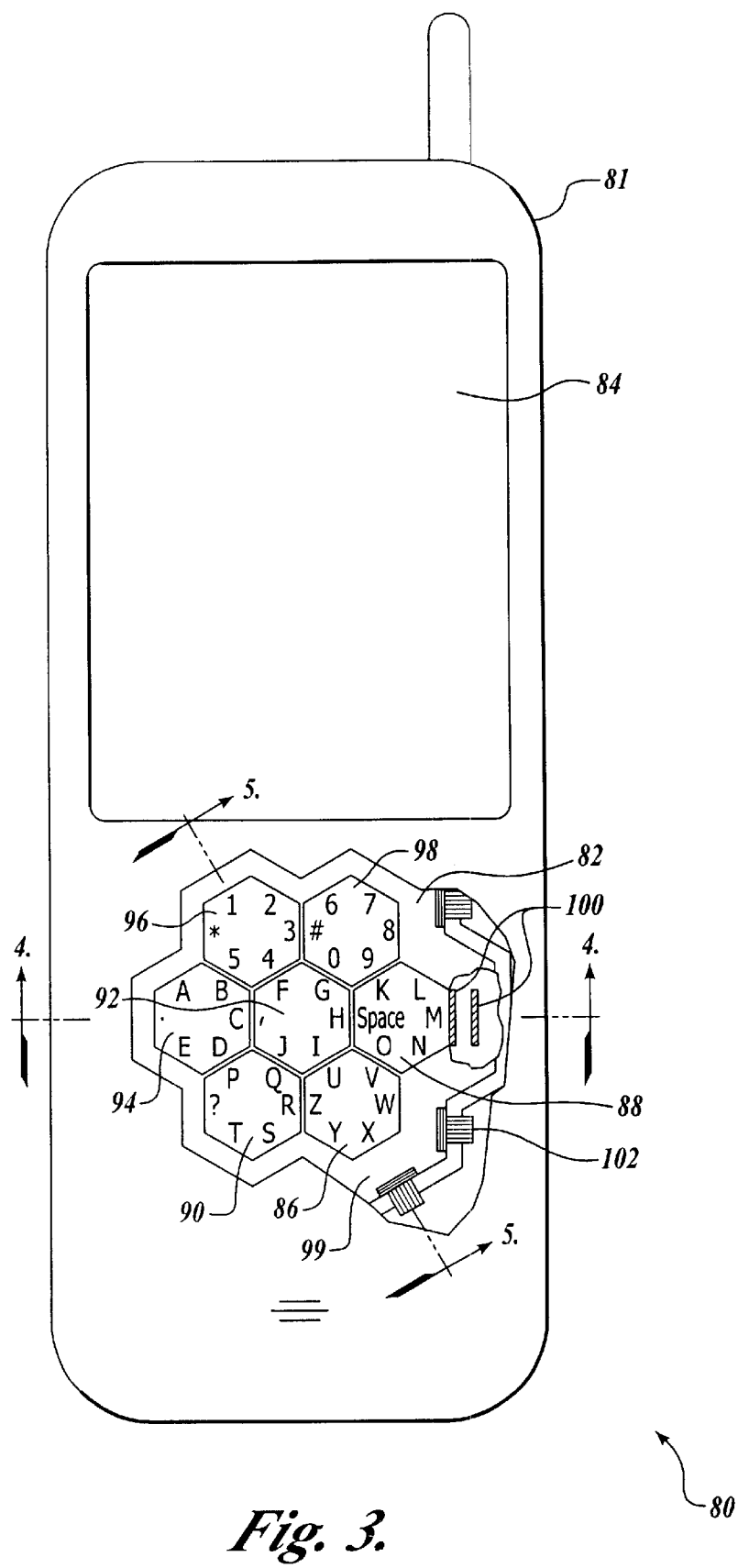
FIG. 3 is a partial X-ray front view of the present invention implemented on a device.

FIG. 3 illustrates an example electronic communications device 80 that provides the functionality described above. The device 80 includes a processor with memory (not shown) within a housing 81, an input/output keyboard system 82 and a display 84. The processor is in signal communications with the keyboard system 82 and the display 84. The input/output keyboard system 82 includes seven hexagon-shaped keys 86–98 that are slidably received within a support structure 99. The two keys 96, 98 closest to the display 84 have the numbers 1–0 and symbols *, #, each of which are displayed adjacent to an edge of the keys. On the other keys 86–94 are displayed the letters of the English alphabet, the symbols . , ? and the space function. The displayed location of the letter, symbol or function indicates the associated key and direction of motion for inputting and outputting. The keys 86–90 and 94–98 are arranged around a center key 92. Other key shapes and geometric layout can be used without departing from the scope of the invention. Shown in an x-ray view of the housing 81 are lateral sensors 100 and electromagnet motion drivers 102. The lateral sensors 100 sense lateral motion of the keys when the user moves the keys and the electromagnet motion drivers 102 move the keys laterally for outputting. The lateral sensors 100 are parallel to the three edges of key 88 that are not adjacent to another key. If the lateral sensors 100 can only sense one motion direction each, three additional lateral sensors, not shown, are positioned parallel to the edges of other keys that would allow sensing of the 3 of 6 motions not sensed by the sensors 100. Preferably these three additional lateral sensors would be positioned around the edges of key 94 that are not adjacent to other keys.

The electromagnet motion drivers 102 are positioned parallel to most or all of the edges of the keys that are not adjacent to any other keys or the lateral sensors 100. The electromagnet motion drivers 102 repel or attract the closest key edge according to a key control signal sent from the processor.

Figure 4:
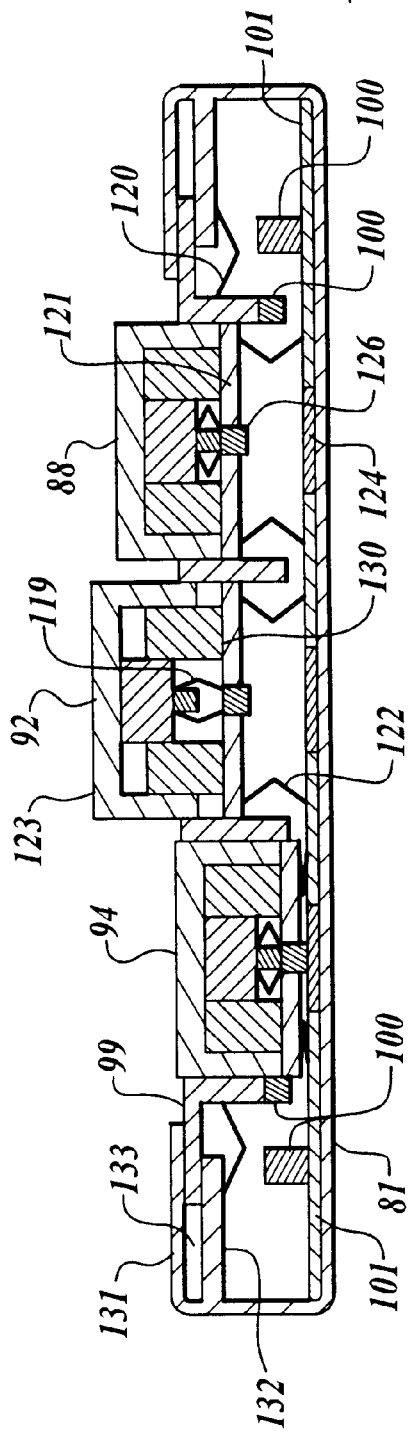
FIGS. 4 and 5 are cross-sectional views of the device shown in FIG. 3.
Figure 5:
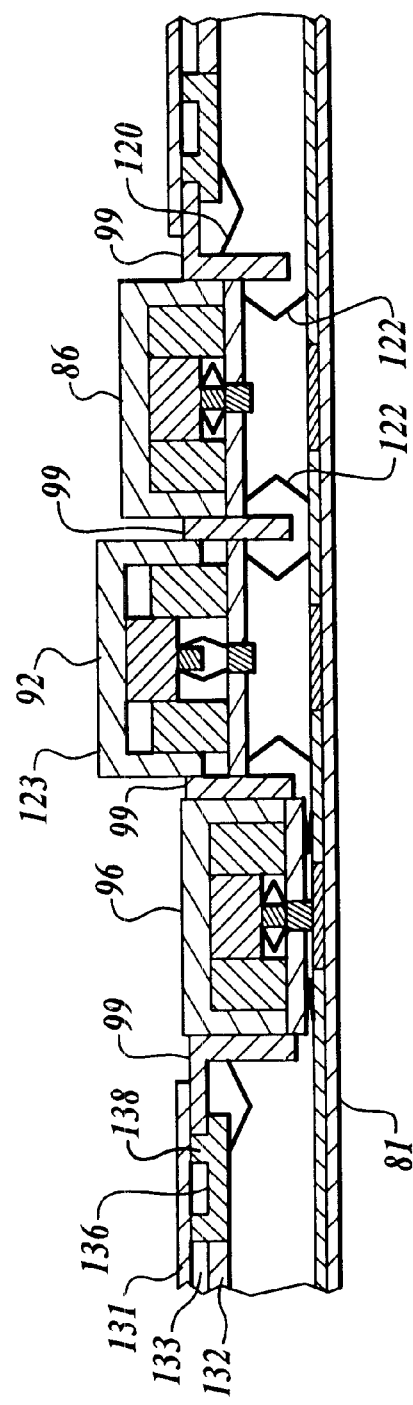

FIGS. 4 and 5 illustrate cross-sections of the example electronic communications device 80 shown in FIG. 3. Each key is mounted on spring like devices 122 that allow depression of the key from a normal position, see key 86 and 88 position. Each key is slidably mounted in the support structure 99. Each key includes a base 121, a vertical motion driver 130, such as a solenoid, mounted on the base 121, a key button 123 and a connection device 119. The connection device 119 connects the key button 123 to the base 121, while allowing the solenoid 130 to force the key button 123 to extend away from the normal position, see key 92.

The base 121 also includes a first key depression sensor 126. Inside the housing 81 at the housing base is mounted a sensor board 101. Within the sensor board 101 are second key depression sensors 124 that are positioned below each key. Lateral spring devices 120 are attached to the support structure 99. As shown in FIG. 4, the lateral sensor 100 includes two sensor components; a first component attached to the support structure 99 and a second component attached to the sensor board 101. The second component senses lateral or directional key motion when lateral movement of the keys positions the first sensor within a threshold distance.

A top surface 131 of the housing 81 and a plate 132 that extends from the side of the housing 81 creates a cavity 133. The cavity slidably receives an extension portion of the support structure 99. The cavity allows the support structure 99 to slide on an X-Y plane (X-Y plane being approximately parallel to the top surface of the device 80). Mounted within the cavity 133 is the lateral motion driver 102 that includes electromagnets 136, 138. The electromagnet 136 is mounted in the cavity 133 and the electromagnet 138 is mounted onto the free end of support structure's extension portion. The lateral motion driver 102 can push or pull the support structure 99 depending upon the charge applied to the electromagnets 136, 138. Other driving devices can be used in place of the electromagnets and the solenoids, such as metal or rubber springs, electro motors or other electrically driven mechanical device.

Figure 6A:
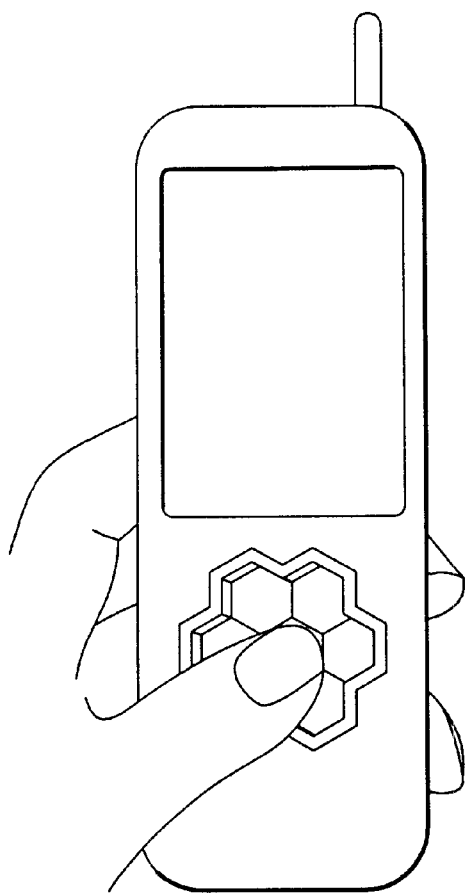
FIGS. 6A and B are illustrations of user interaction with the present invention.
Figure 6B:
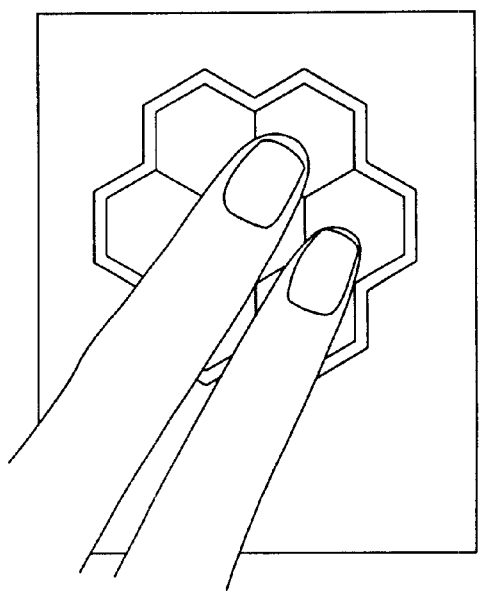

If the word the processor has parsed is "can" and no macro exists for "can", the processor breaks "can" into its base components, which are "c", "a", and "n". Then the processor sends three separate output signals (key control signals) to command key motion. The first output signal causes one or all of the electromagnets 136, 138 to force the keys 86–98 in the 3:00 direction because the 3:00 direction corresponds to the letter "c". The first output signal also causes the vertical motion driver 130 in the key 94 with the letter "c" to move the key button of the key 94 to extend from the key's normal position. Thus, when one or more of the user's fingers are in contact with all the keys, see FIGS. 6A and B, the user senses the key 94 extending from the normal position and all the keys moving in the 3:00 direction. From these sensed motions the user determines the "c" is the intended letter. Before the next lateral and vertical key motion pair is performed, the keys return to their normal position. The keyboard system continues this process for presenting the letters "a" and "n" to the user. As shown in FIG. 6A, the keys may be small enough to allow just the user's thumb to sense motion of any of the keys. In this embodiment, the present invention can be used by a user holding the device in a single hand. The keys could be larger, thereby requiring the user to use more than one finger to sense motion of all the keys, see FIG. 6B.

Referring back to FIG. 2, the processor 22, at block 54, determines whether any macros are assigned to any of the parsed items. Macros link a word to a set of output key motions. Preferably, the linked words are from a group of words commonly used in messages. As shown in FIGS. 7A–C words are assigned to directional key motions. For example, a key 160 has the words "they/them" assigned to approximately the 1:00 key motion direction, "it" assigned to approximately the 3:00 key motion direction, "I/me" assigned to approximately the 5:00 key motion direction, and "you" assigned to approximately the 7:00 key motion direction. When the key driver system 30 causes the key 160 to extend and move in the 3:00 direction, the user understands that the word "it" is the word that is being outputted to the user. When words are conveyed to a user through pairs of key motions instead of conveying a single letter at a time, a message can be sent in a lesser amount of key motions, thereby making message delivery more efficient.

In an alternate embodiment, the processor 22 can be programmed to output abbreviations of various words to the dual-purpose keyboard 21. This can be implemented in an abbreviations mode of operation that the user can select once they have knowledge of the abbreviations that can be used.

While the preferred embodiment of the invention has been illustrated and described, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A user interface device comprising:
    a plurality of geometrically-shaped keys slidably retained within a housing, each key being associated with a plurality of characters or symbols; and
    a key driver system comprising:
        a processing component configured to generate key motion signals according to output information; and
        key motion drivers configured to drive one or more of the keys based on the generated key motion signals.

2. The device of claim 1, wherein the key motion drivers comprise:
    a lateral motion component configured to move the one or more keys in a directional plane approximately parallel to a surface of the keys; and
    key identifier components configured to move a corresponding one or more keys of the plurality of keys in a directional plane approximately perpendicular to the surface of the keys.

3. The device of claim 2, wherein the lateral motion component comprises a plurality of electromagnets.

4. The device of claim 2, wherein the key identifier component comprises a plurality of solenoids, wherein each of the solenoids is assigned to a separate key.

5. The device of claim 2, wherein each key is hexagon-shaped.

6. The device of claim 5, wherein the lateral motion component drives the plurality of keys in directions that correspond to each edge of the keys.

7. The device of claim 2, wherein each character and symbol associated with a key is further associated with a lateral motion direction and the output information is a text message, and
    wherein the processing component is further configured to parse the text message into base components, base components correspond to one of the characters or symbols associated with the keys, and generate a pair of key motion signals for each base component, the generated pair of key motion signals comprises a lateral signal for directing the lateral motion component and a key signal for directing one of the key identifier components.

8. The device of claim 7, wherein one or more base components correspond to one or more words that are associated with a lateral motion direction and a key.

9. A user interface method using a plurality of geometrically-shaped keys, each key being associated with a plurality of characters or functions, comprising:
    parsing a text message into base components, each base component corresponds to a character or symbol associated with a key;
    generating a pair of key control signals based on each base component; and
    moving one or more of the keys in two directions based on the generated pair of key control signals,
    wherein each character and symbol associated with a key is further associated with a lateral motion direction.

10. The method of claim 9, wherein one or more base components correspond to one or more words that are associated with a lateral motion direction and a key.

11. A user interface device comprising:
    a plurality of keys slidably retained within a housing, each key being associated with a plurality of characters or symbols; and
    a key driver system comprising:
        a processing means for generating key motion signals according to output information; and
        key motion driver means for driving one or more of the keys based on the generated key motion signals.

12. The device of claim 11, wherein the key motion driver means comprise:
    a lateral motion means for moving the one or more of the keys in a directional plane approximately parallel to a surface of the keys; and
    a key identifier means for moving each of the plurality of keys in a directional plane approximately perpendicular to the surface of the keys.

13. The device of claim 12, wherein the lateral motion means comprises a plurality of electromagnets.

14. The device of claim 12, wherein the key identifier means comprises a plurality of solenoids, wherein each of the solenoids is assigned to a separate key.

15. The device of claim 12, wherein each key is hexagon-shaped.

16. The device of claim 15, wherein the lateral motion means drives the plurality of keys in directions that correspond to each edge of the keys.

17. The device of claim 12, wherein each character and symbol associated with a key is further associated with a lateral motion direction and the output information is a text message, and wherein the processing means further parses the text message into base components, base components correspond to one of the characters or symbols associated with the keys, and generates a pair of key motion signals for each base component, the generated pair of key motion signals comprises a first signal for directing the lateral motion means and a second signal for directing the key identifier means.

18. The device of claim 17, wherein one or more base components correspond to one or more words that are associated with a lateral motion direction and a key.

19. A user interface device comprising:

a plurality of geometrically-shaped keys slidably retained within a housing, each key being associated with a plurality of characters, functions or symbols; and a key driver system comprising:

a processing component configured to generate key motion signals according to output information; and key motion drivers configured to drive one or more of the keys based on the generated key motion signals;

a force detector configured to detect force applied to one or more of the plurality of keys;

a lateral movement sensor configured to sense direction of motion of the plurality of keys; and a selection component for selecting at least one of a character or function based on the detected force and the sensed direction of motion.

* * * * *